United States Patent
Cogley

(10) Patent No.: US 10,492,462 B1
(45) Date of Patent: Dec. 3, 2019

(54) ANIMAL CLINICAL CARRIER SYSTEM

(71) Applicant: Thomas Paul Cogley, Pinellas Park, FL (US)

(72) Inventor: Thomas Paul Cogley, Pinellas Park, FL (US)

(*) Notice: Subject to any disclaimer, the term of this patent is extended or adjusted under 35 U.S.C. 154(b) by 241 days.

(21) Appl. No.: 15/821,525

(22) Filed: Nov. 22, 2017

Related U.S. Application Data

(60) Provisional application No. 62/425,786, filed on Nov. 23, 2016.

(51) Int. Cl.
- A01K 1/02 (2006.01)
- A01K 29/00 (2006.01)
- A01K 1/01 (2006.01)

(52) U.S. Cl.
CPC .......... *A01K 1/0245* (2013.01); *A01K 1/0107* (2013.01); *A01K 29/005* (2013.01)

(58) Field of Classification Search
CPC .... A01K 1/0245; A01K 1/0236; A01K 1/031; A01K 1/0035; A01K 29/005
See application file for complete search history.

(56) References Cited

U.S. PATENT DOCUMENTS

| | | | | |
|---|---|---|---|---|
| 5,247,901 A | * | 9/1993 | Landon | A01K 1/031 119/417 |
| 5,251,572 A | * | 10/1993 | Frame | A01K 1/0236 119/417 |
| 5,503,107 A | * | 4/1996 | Satcher | A01K 1/0236 119/496 |
| 9,504,230 B1 | * | 11/2016 | Schillero, Jr. | A01K 1/0236 |
| 2008/0029043 A1 | * | 2/2008 | Lawrence | A01K 1/0245 119/501 |
| 2009/0050069 A1 | * | 2/2009 | Hurwitz | A01K 1/0245 119/497 |
| 2009/0205578 A1 | * | 8/2009 | Alves | A01K 1/0107 119/454 |
| 2014/0261222 A1 | * | 9/2014 | Hampel | A01K 1/0088 119/502 |
| 2016/0057968 A1 | * | 3/2016 | Chandler | A01K 1/0272 119/497 |
| 2017/0267153 A1 | * | 9/2017 | Novero | B60P 3/04 |

* cited by examiner

Primary Examiner — Monica L Williams

(57) ABSTRACT

An animal carrier has a top, bottom, front, back and sides forming a chamber, and a door. Fixed slots are formed in the sides with shiftable panels overlying the sides. The panels have shiftable slots with shiftable blockers between the slots. an enlarged opening in the front has horizontal edges extending from the top and bottom and vertical edges extending from the sides. A vertically disposed shiftable plate within the chamber is adapted to advance to expel the animal patient from the chamber. Wheels and associated fans function to create an airflow to minimize a force to move the system along a floor. A drainboard is positioned within the chamber on the bottom for draining urine to a collection zone. A slot above the collection zone is for removable receipt of a test slip for clinical analysis of the urine.

15 Claims, 8 Drawing Sheets

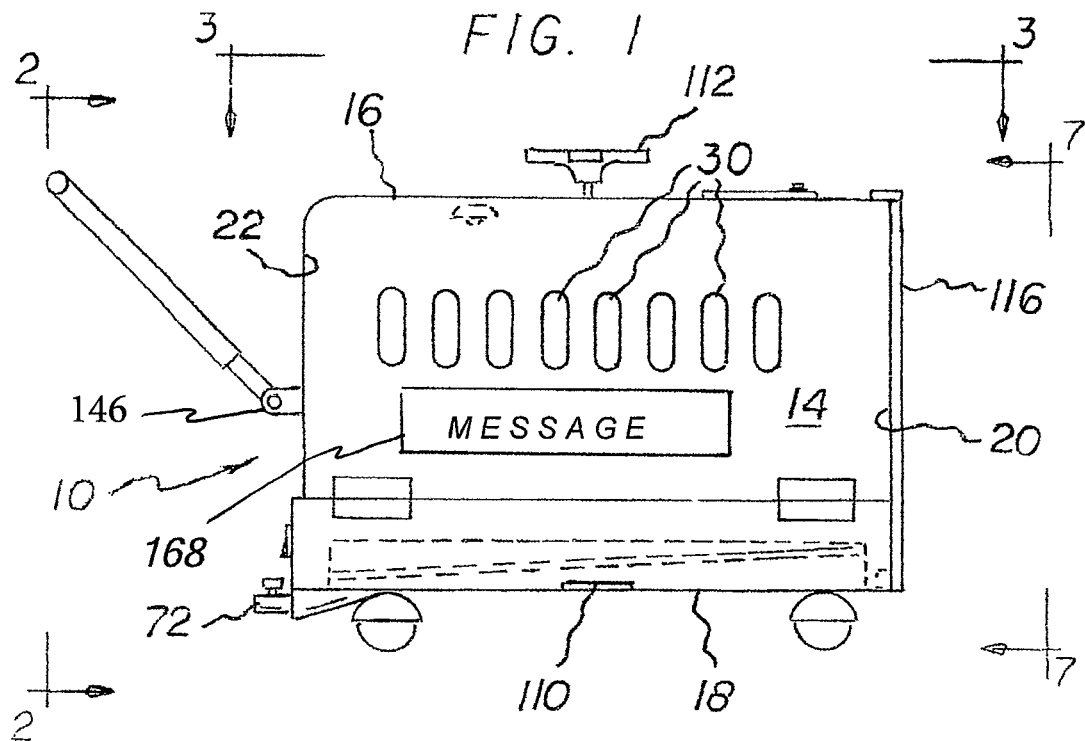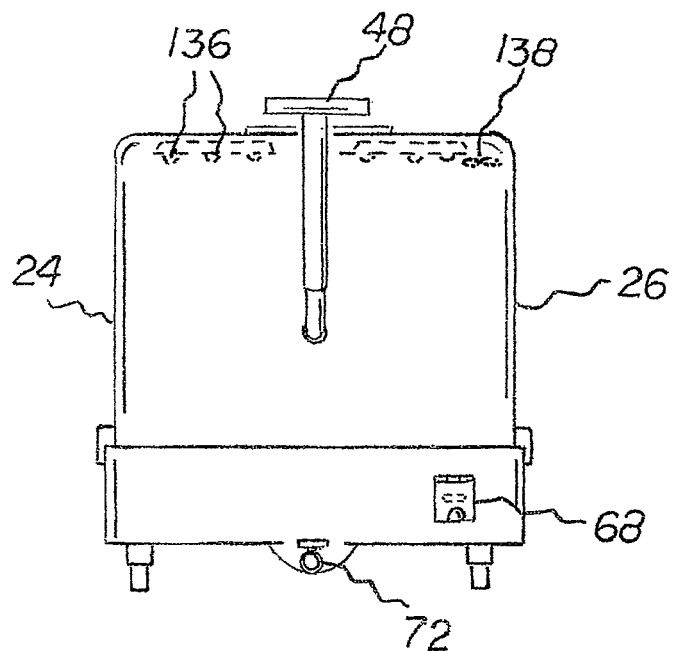

FIG. 6
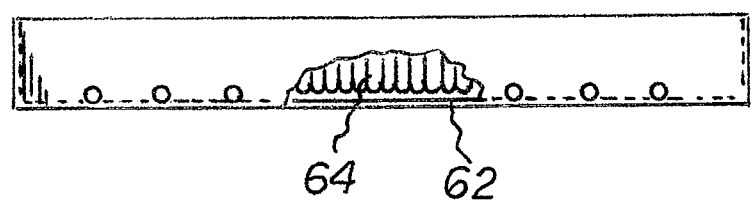
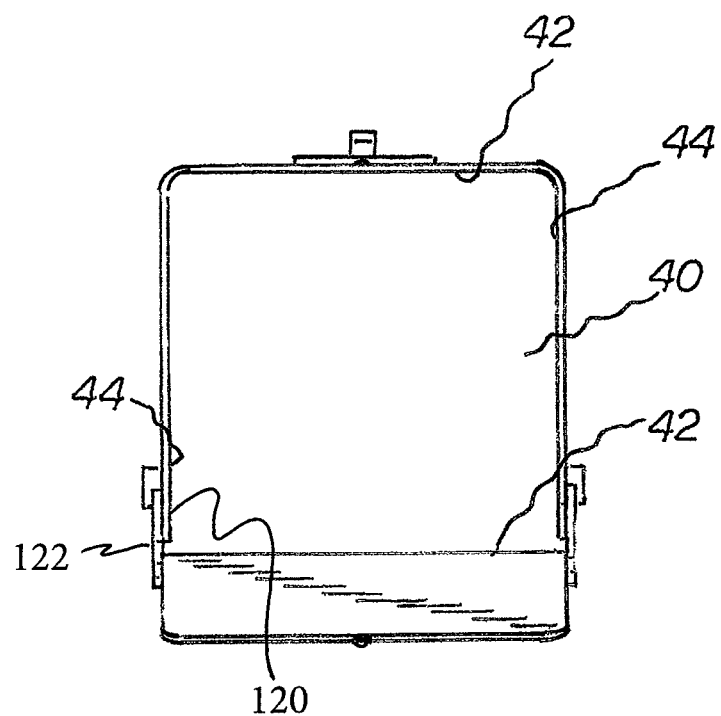
FIG. 7

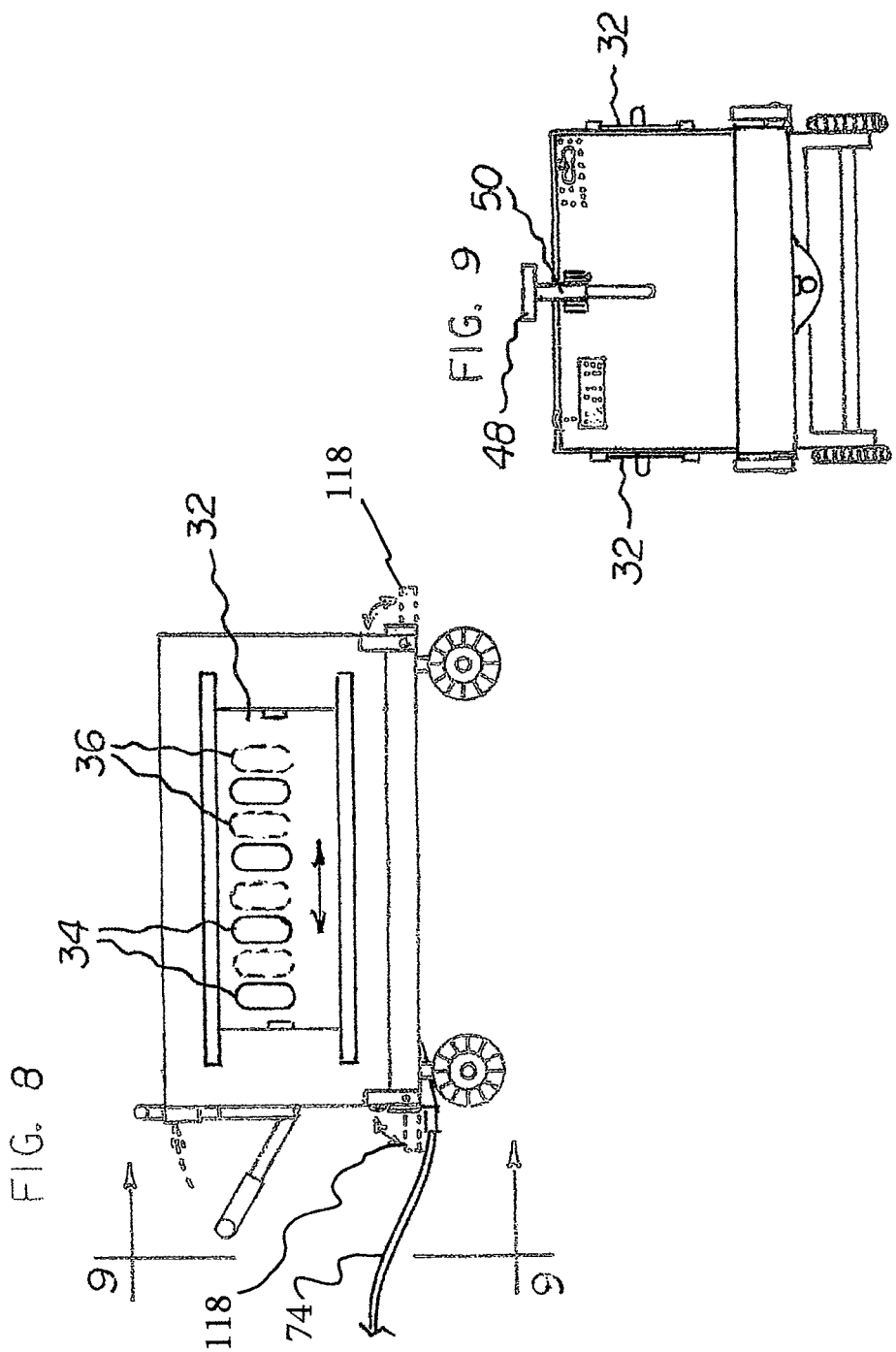

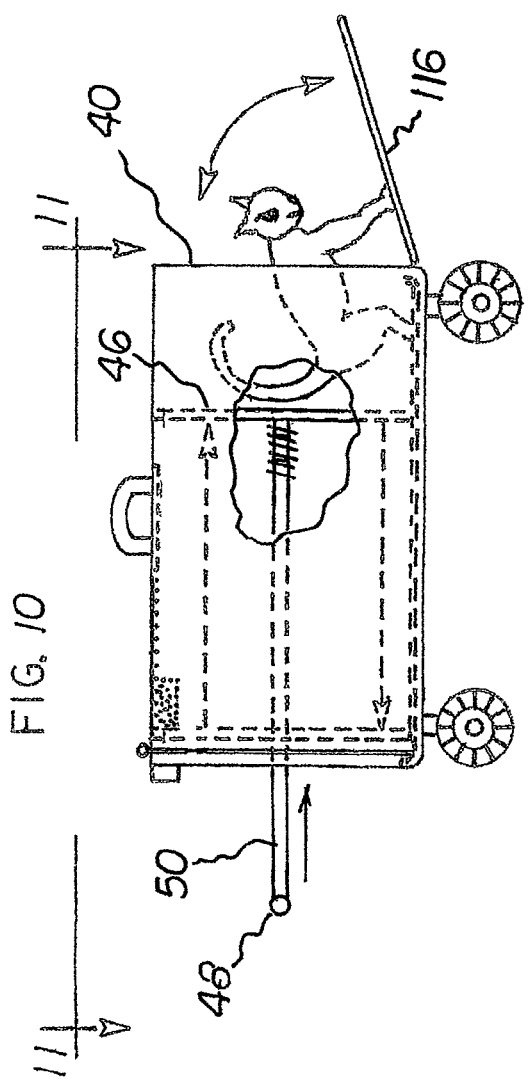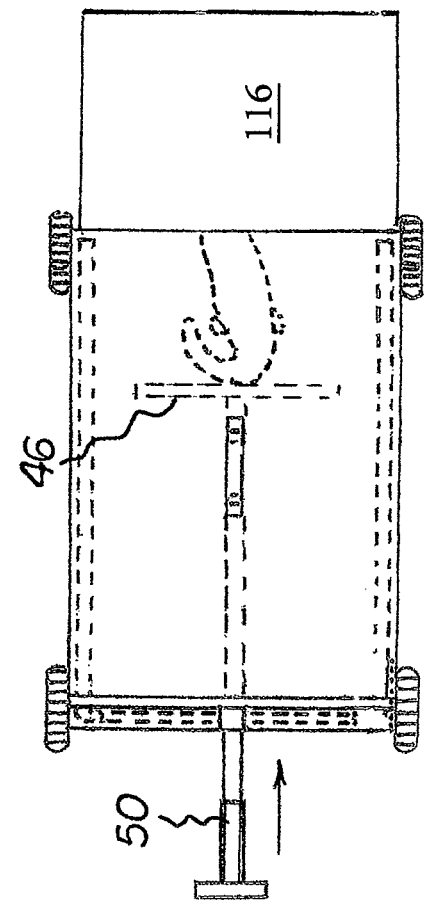

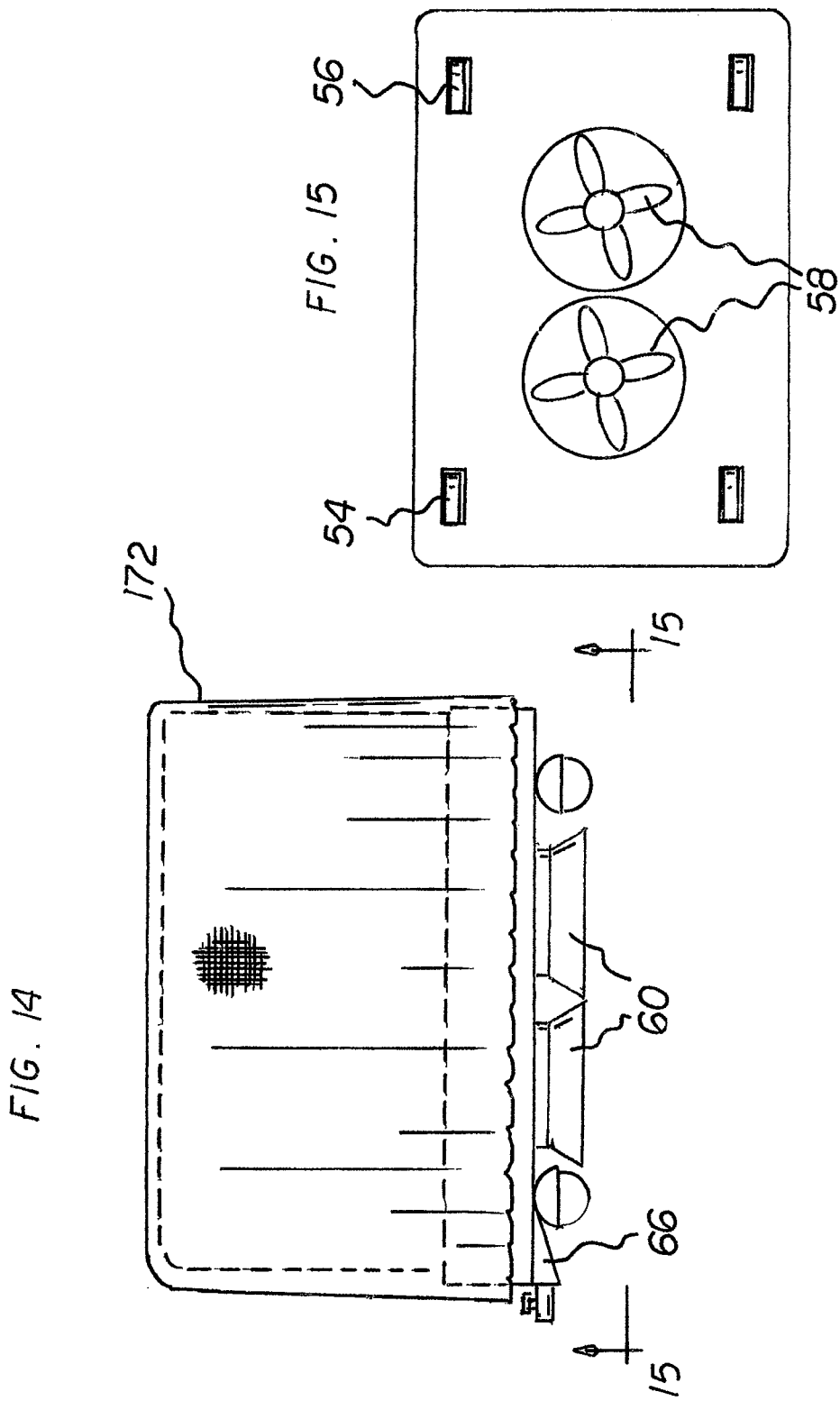

158

ANIMAL CLINICAL CARRIER SYSTEM

RELATED APPLICATION

The present invention, the animal clinical carrier system, is based upon Provisional Application No. 62/425,786 filed Nov. 23, 2016, the subject matter of which is incorporated herein by reference and the priority of which is hereby claimed.

BACKGROUND OF THE INVENTION

Field of the Invention

The present invention relates to an animal clinical carrier system and more particularly pertains to maximizing convenience to a care giver and minimizing discomfort of an animal patient in a safe and convenient manner.

Description of the Prior Art

The use of animal carrier systems of known designs and configurations is known in the prior art. More specifically, animal carrier systems of known designs and configurations previously devised and utilized for the purpose of transporting and providing clinical care for animals are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, they do not describe an animal clinical carrier system that maximizes convenience to a care giver and minimizes discomfort of an animal patient in a safe and convenient manner.

In this respect, the animal clinical carrier system according to the present invention substantially departs from the conventional concepts and designs of the prior art, and in doing so provides an apparatus primarily developed for the purpose of maximizing convenience to a care giver and minimizing discomfort of an animal patient in a safe and convenient manner.

Therefore, it can be appreciated that there exists a continuing need for an animal clinical carrier system which can be used for maximizing convenience to a care giver and minimizing discomfort of an animal patient in a safe and convenient manner. In this regard, the present invention substantially fulfills this need.

SUMMARY OF THE INVENTION

In view of the foregoing disadvantages inherent in the known types of animal carrier systems of known designs and configurations now present in the prior art, the present invention provides an improved animal clinical carrier system. As such, the general purpose of the present invention, which will be described subsequently in greater detail, is to provide an animal clinical carrier system and method which has all the advantages of the prior art and none of the disadvantages.

To attain this, the present invention essentially comprises an animal carrier with a top, bottom, front, back and sides forming a chamber. Fixed slots are formed in the sides with shiftable panels overlying the sides. The panels have shiftable slots with shiftable blockers between the slots. An enlarged opening in the front has horizontal edges extending from the top and bottom and vertical edges extending from the sides. A vertically disposed shiftable plate within the chamber is adapted to advance to expel the animal patient from the chamber. Wheels and associated fans function to create an airflow to minimize a force to move the system along a floor. A drainboard is positioned within the chamber on the bottom for draining urine to a collection zone. A slot above the collection zone is for removable receipt of a test slip for clinical analysis of the urine.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide an animal clinical carrier system which has all of the advantages of the prior art animal carrier systems of known designs and configurations and none of the disadvantages.

It is another object of the present invention to provide an animal clinical carrier system which may be easily and efficiently manufactured and marketed.

It is further object of the present invention to provide an animal clinical carrier system which is of durable and reliable constructions.

Lastly, it is another object of the present invention is to provide an animal clinical carrier system for maximizing convenience to a care giver and minimizing discomfort of an animal patient in a safe and convenient manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of an animal carrier system constructed in accordance with the principles of the present invention.

FIG. 2 is a rear elevational view taken along line 2-2 of FIG. 1.

FIG. 6 is an end elevational view taken along line 6-6 of FIG. 5.

FIG. 7 is a front elevational view taken along line 7-7 of FIG. 1.

FIG. 8 is a side elevational view similar to FIG. 2 but configured for the introduction of gas.

FIG. 9 is a rear elevational view taken along line 9-9 of FIG. 8.

FIG. 10 is a side elevational view, partly in cross section, showing an animal patient being removed from the carrier.

FIG. 11 is a plan view taken along line 11-11 of FIG. 10.

FIG. 14 is a side elevational view of the carrier with a pull-over skirting in a covering position.

FIG. 15 is a bottom view taken along line 15-15 of FIG. 14.

The same reference numerals refer to the same parts throughout the various Figures.

DESCRIPTION OF THE PREFERRED EMBODIMENT

Figure 3:
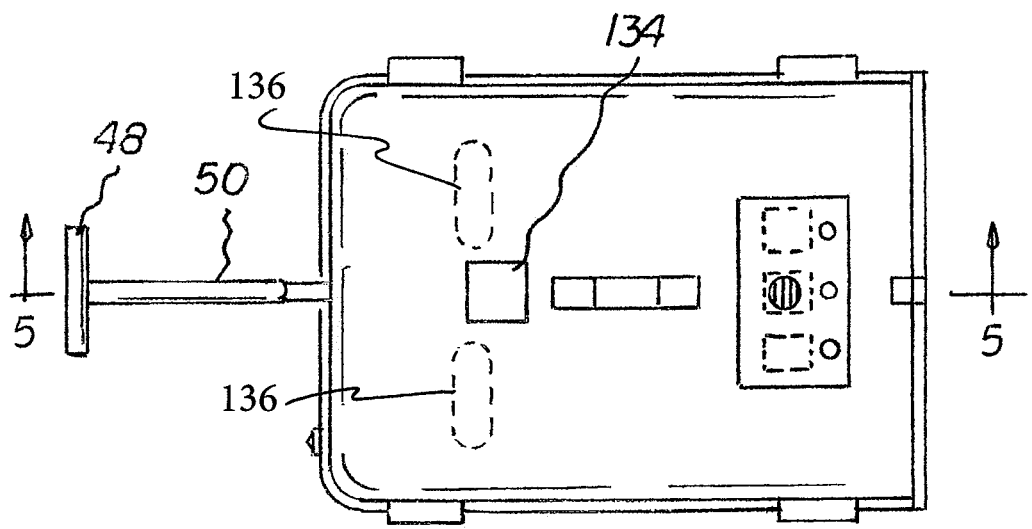
FIG. 3 is a plan view taken along line 3-3 of FIG. 1.
Figure 4:
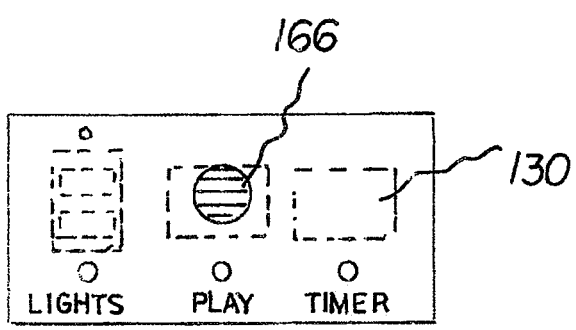
FIG. 4 is a plan view of a portion of the top of the carrier showing the light emitting diodes, LED sign, and timer of FIG. 3.
Figure 5:
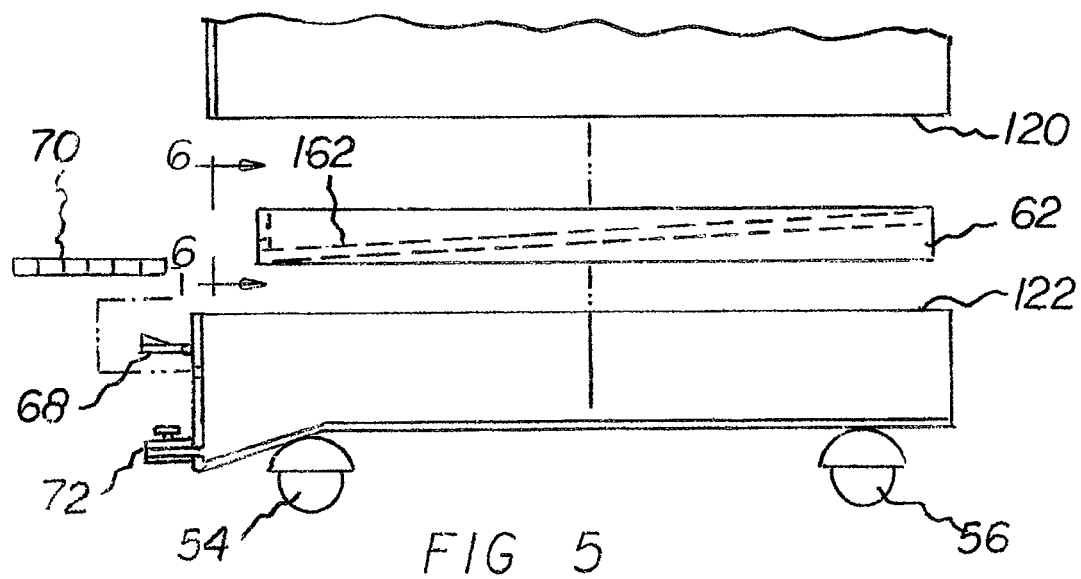
FIG. 5 is an exploded cross sectional view taken along line 6-6 of FIG. 5.
Figure 13:
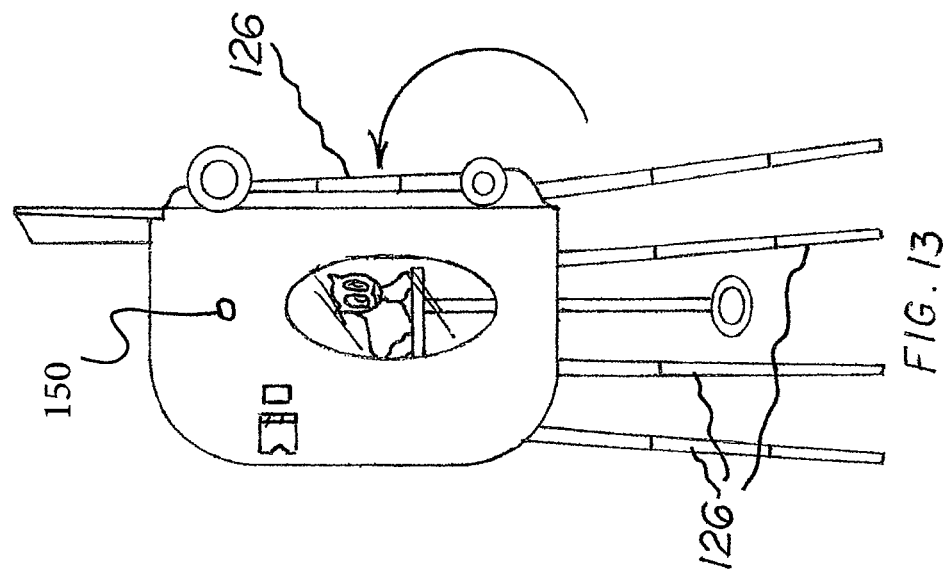
FIG. 13 is a side elevational view of the carrier with the pull-out legs in a deployed position.
Figure 12:
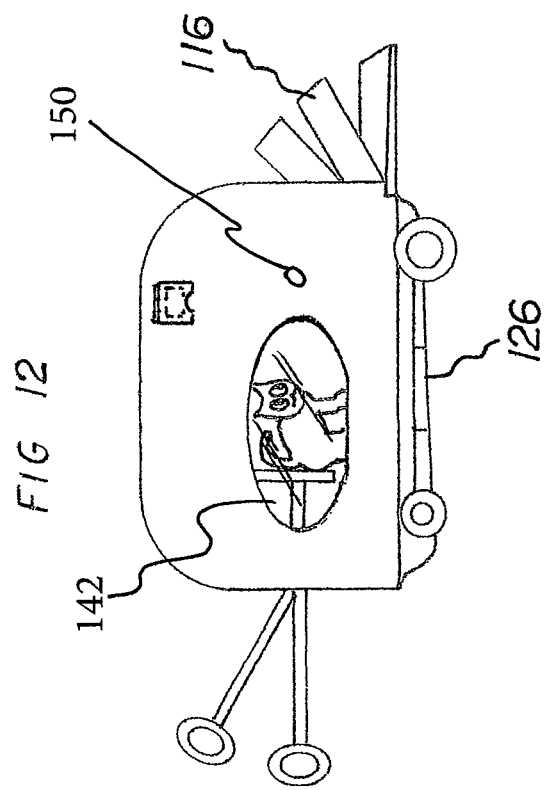
FIG. 12 is a side elevational view of the carrier with the pull-out legs in a stowed position.
Figure 16:
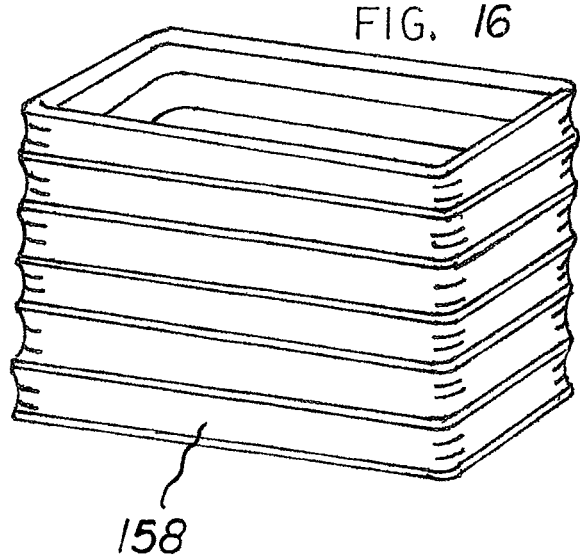
FIG. 16 is a perspective view of the pull-up skirting in a covering position.

With reference now to the drawings, and in particular to FIG. 1 thereof, the preferred embodiment of the animal clinical carrier system embodying the principles and concepts of the present invention and generally designated by the reference numeral 10 will be described.

The present invention, the animal clinical carrier system 10 is comprised of a plurality of components. Such components in their broadest context include a carrier with slots, an enlarged opening, transport facilitators, and a urine collection assembly. Such components are individually configured and correlated with respect to each other so as to attain the desired objective.

The animal clinical carrier system 10 of the present invention is for maximizing convenience to a care giver and for minimizing discomfort of an animal patient in a safe and convenient manner. In the preferred embodiment, first provided is a carrier 14. The carrier has a top 16 and a bottom 18 separated by a height, a front 20 and a back 22 separated by a length, and a left side 24 and a right side 26 separated by a width. A chamber is formed between the top and bottom and between the front and the back and between the left and right sides. A carrier door 116 is provided.

Next provided are a plurality of fixed slots 30 formed in the sides. Panels 32 overlie the sides. The panels have shiftable slots 34 with shiftable blockers 36 between the slots. The panels are movable to an opened orientation with the shiftable slots overlying the fixed slots. The panels are movable to a closed orientation with the shiftable slots overlying the shiftable blockers to enclose the chamber.

The carrier has an enlarged opening 40 in the front. The front terminates in horizontal edges 42 extending from the top and from the bottom. The front terminates in vertical edges 44 extending from the left side and from the right side. A shiftable plate 46 is vertically disposed within the chamber. A grip 48 is provided exterior of the chamber. A pivotal rod 50 extends through the back coupling the grip and the shiftable plate. The grip and rod are designed to be manipulated by a care giver to advance the shiftable plate to expel the animal patient from the chamber with minimized resistance provided by the enlarged opening.

Next, transport facilitators are coupled to the bottom of the carrier. The transport facilitators include two laterally spaced wheels 54 beneath the back and two laterally spaced wheels 56 beneath the front. The transport facilitators also include two fans 58. Each fan is in a peripheral housing 60. The air flow emanating from the fans minimizes the force required to move the system along a floor.

A urine collection assembly is next provided. The urine collection assembly includes a drainboard 62 positioned within the chamber on the bottom. The drainboard is planar and positioned higher adjacent to the front than adjacent to the back. The drainboard has linear recesses 64 for draining urine to a collection zone 66 adjacent to the back. A slot 68 above the collection zone is provided for removable receipt of a test slip 70 for clinical analysis of the urine. A drain port 72 is next provided for gravity removal of the urine. The drain port also functions to introduce gas through line 74 into the chamber when the panels are into a closed orientation.

Next, a scale 110 is provided within the chamber or in the handle itself. A hand held readout 112 is provided to read the weight of the animal upon entry and/or exit.

The carrier door 116 in the preferred embodiment is similar to a walk-in horse trailer ramp. The complete opening is visible. The carrier door opening does not hurt the animal patient or get the animal patient's legs caught. The animal patient cannot use the edges to prevent being pushed out. In an alternate embodiment, the carrier door is removable and replaceable.

Couplers 118 are next provided. In this manner, the bottom and the carrier door 116 are removable and replaceable with a cat litter bottom for use of the system at home creating a covered cat box thereby retaining the same smells in the system for the animal patient to reduce the animal patient's resistance to entering the carrier.

A lower extent 120 of the top fits inside an upper extent 122 of the bottom so that urine does not overflow from spray and go outside of the carrier.

Pull-out legs 126 are provided for use to assist in orienting the carrier with the front upward so that the animal can be lowered into the carrier.

Next, a timer 130 is provided on one side of the carrier. The time is adapted to ring at 60 seconds and 120 seconds which are the normal times between which test slip readings may be read accurately.

Light emitting diodes 136 and mini-fans 138 are next provided. A solar panel 134 provides power to the light emitting diodes and mini-fans.

A one-way viewable acrylic mirror 142 is provided in the carrier so that care givers can see the animal in the carrier and so that the animal is not frightened by seeing outside of the carrier.

A lever 146 is next provided. The lever is positionable at a 45 to 65 degree angle and also positionable parallel with the floor to facilitate pushing and pulling the carrier.

Next provided are push buttons 150 on the carrier to set off an infrared temperature reading of the skin of the animal. The normal reading is between 84 and 86 degrees.

Next a pull-up skirting 158 is provided for reducing contamination of a hospital with ectoparasites and pathogens from a caged animal.

A pull-over skirting 172 fabricated of cloth is provided for reducing contamination of a hospital with ectoparasites and pathogens from a caged animal.

Lastly, an optional message sign 168 and a microphone/speaker 166 are provided on the carrier to allow the owner to provide a name of a pet, the ailment the owner thinks is a problem, and any other pertinent information. In the preferred embodiment, the sign is a scrolling message sign. Alternately, the message may be recorded and played back through a recording device.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An animal clinical carrier system (10) for maximizing convenience to a care giver and for minimizing discomfort of an animal patient, the system comprising, in combination:
    a carrier (14) having a top (16) and a bottom (18) separated by a height, a front (20) and a back (22) separated by a length, sides being a left side (24) and a right side (26) separated by a width, a chamber formed between the top and bottom and between the front and the back and between the left and right sides, and a carrier door (116);
    a plurality of fixed slots (30) formed in the sides, panels (32) overlying the sides, the panels having shiftable slots (34) with shiftable blockers (36) between the slots, the panels being movable to an opened orientation with the shiftable slots overlying the fixed slots, the panels being movable to a closed orientation with the shiftable slots overlying the shiftable blockers to enclose the chamber;
    the carrier having an enlarged opening (40) in the front, the front terminating in horizontal edges (42) extending from the top and from the bottom, the front terminating in vertical edges (44) extending from the left side and from the right side, a shiftable plate (46) vertically disposed within the chamber, a grip (48) exterior of the chamber, a pivotal rod (50) extending through the back coupling the grip and the shiftable plate (46), the grip and rod capable of being manipulated by the care giver to advance the shiftable plate to expel the animal patient from the chamber with minimized resistance provided by the enlarged opening;
    transport facilitators coupled to the bottom of the carrier, the transport facilitators including two laterally spaced wheels (54) beneath the back and two laterally spaced wheels (56) beneath the front, the transport facilitators also including two fans (58) each with a peripheral housing (60), the fans and peripheral housings creating an airflow emanating from the peripheral housings to minimize a force to move the system along a floor; and
    a urine collection assembly including a drainboard (62) positioned within the chamber on the bottom, the drainboard being planar and positioned higher adjacent to the front than adjacent to the back, the drainboard having linear recesses (64) for draining urine to a collection zone (66) adjacent to the back, a slot (68) above the collection zone for removable receipt of a test slip (70) for clinical analysis of the urine, a drain port (72) for gravity removal of the urine, the drain port also functioning to introduce gas through a line (74) into the chamber when the panels are in a closed orientation.

2. The system as set forth in claim 1 and further including:
    a scale (110) to weigh the animal patient and a hand held read out (112) to read the weight of the animal patient upon entry and/or exit.

3. The system as set forth in claim 1 and further including couplers (118) wherein:
    the bottom and the carrier door (116) are removable and replaceable with a cat litter bottom for use at home creating a covered cat box thereby retaining the same smells in the system for the animal patient.

4. The system as set forth in claim 1 and further including:
    a lower extent (120) of the top positionable inside an upper extent (122) of the bottom so that urine does not overflow from spray and go outside of the carrier.

5. The system as set forth in claim 1 and further including:
    pull out legs (126) to orient the carrier with the front upward so that the animal patient can be lowered into the carrier.

6. The system as set forth in claim 1 and further including:
    a timer (130) on one of the sides of the carrier to ring at 60 second and 120 seconds which are normal times between which test slip readings may be read accurately.

7. The system as set forth in claim 1 and further including:
    light emitting diodes (136);
    mini-fans (138); and
    a solar panel (134) to provide power for the light emitting diodes and mini-fans.

8. The system as set forth in claim 1 wherein:
    the carrier is constructed with a one-way viewable acrylic mirror (142) to allow care givers to see the animal patient in the carrier.

9. The system as set forth in claim 1 and further including:
    a lever (146) positionable at a 45 to 65 degree angle and positionable parallel with the floor to pull or push the carrier.

10. The system as set forth in claim 1 and further including:
    push buttons (150) to initiate an, infrared temperature reading of the skin of the animal patient, the normal reading being 84-86 degrees.

11. The system as set forth in claim 1 wherein:
    the carrier door (116) is of the ramp type with the complete opening visible and with no cage door opening to hurt the animal patient and get the animal patient's legs caught and prevent the animal patient from using edges to prevent being pushed out.

12. The system as set forth in claim 1 wherein:
the carrier door is removable and replaceable.

13. The system as set forth in claim 1 and further including:
- pull-up skirting (158) for reducing contamination of a hospital with ectoparasites and pathogens from the animal patient.

14. The system as set forth in claim 1 and further including:
- a message sign (168) and a microphone/speaker (166) to allow an owner to provide a name of a pet and an ailment the owner thinks is a problem and other information.

15. The system as set forth in claim 1 and further including:
- a pull-over skirting (172) for reducing contamination of a hospital with ectoparasites and pathogens from a caged animal patient.

\* \* \* \* \*